United States Patent
Blom-Schieber et al.

(10) Patent No.: US 11,351,744 B2
(45) Date of Patent: Jun. 7, 2022

(54) MOLTEN EXTRUSION LOADING FOR COMPRESSION MOLDS USING CHOPPED PREPREG FIBER

(71) Applicant: The Boeing Company, Chicago, IL (US)

(72) Inventors: Adriana Willempje Blom-Schieber, Shoreline, WA (US); Jack Schieber, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 324 days.

(21) Appl. No.: 16/369,234

(22) Filed: Mar. 29, 2019

(65) Prior Publication Data

US 2020/0307126 A1 Oct. 1, 2020

(51) Int. Cl.
*B29C 70/46* (2006.01)
*B29C 70/12* (2006.01)
(Continued)

(52) U.S. Cl.
CPC .............. *B29C 70/46* (2013.01); *B29C 70/12* (2013.01); *B29C 70/54* (2013.01); *B29L 2031/3076* (2013.01)

(58) Field of Classification Search
CPC ......... B29C 70/12; B29C 70/46; B29C 70/54; B29C 2035/0811; B29C 2035/0822; B29C 2035/1616; B29C 2035/1658; B29C 2043/046; B29C 2043/3433; B29C 2043/3438; B29C 33/04; B29C 33/06; B29C 33/34; B29C 43/002; B29C 43/04; B29C 43/34; B29C 43/52; B29C 48/0011;
(Continued)

(56) References Cited

U.S. PATENT DOCUMENTS 3,496,133 A 2/1970 Hoffman
4,414,011 A 11/1983 Layden et al.
(Continued)

FOREIGN PATENT DOCUMENTS

AU 680804 8/1997
DE 69022935 11/1995
(Continued)

OTHER PUBLICATIONS

European Search Report; Application EP20151021; dated Jul. 13, 2020.
(Continued)

*Primary Examiner* — Robert J Grun
(74) *Attorney, Agent, or Firm* — Duft & Bornsen, PC

(57) ABSTRACT

Systems and methods are provided for fabricating composite parts. One embodiment is a method that includes heating a female die having a receptacle and a complementary male die, heating an extruder above a melting point of a thermoplastic within chopped prepreg fiber, in order to melt chopped prepreg fiber disposed within the extruder, extruding the chopped prepreg fiber from the extruder into the receptacle of the female die while the chopped prepreg fiber remains molten, pressing the male die into the female die, causing the molten chopped prepreg fiber to fully enter receptacle, and cooling the chopped prepreg fiber in the receptacle of the female die to form a composite part.

34 Claims, 12 Drawing Sheets

(51) Int. Cl.
    *B29C 70/54* (2006.01)
    *B29L 31/30* (2006.01)
(58) Field of Classification Search
    CPC . B29C 48/32; B29C 48/92; B29L 2031/3076; B29K 2105/12; B29K 2105/14; B29K 2105/26
    See application file for complete search history.

(56) References Cited

U.S. PATENT DOCUMENTS

| | | |
|---|---|---|
| 4,950,532 A | 8/1990 | Das et al. |
| 7,102,112 B2 | 9/2006 | Anderson et al. |
| 8,017,059 B2 | 9/2011 | Matsen et al. |
| 2003/0232176 A1 | 12/2003 | Polk |
| 2005/0074993 A1 | 4/2005 | Alam et al. |
| 2006/0125156 A1 | 6/2006 | Woolhouse |
| 2006/0272278 A1 | 12/2006 | McMahan et al. |
| 2010/0291388 A1 | 11/2010 | Alvarez et al. |
| 2011/0301287 A1 | 12/2011 | Weyant et al. |
| 2015/0253116 A1 | 9/2015 | Vaidya et al. |
| 2018/0290339 A1* | 10/2018 | Nguyen .......... B32B 27/288 |
| 2019/0022897 A1 | 1/2019 | Johnston |

FOREIGN PATENT DOCUMENTS

| | | |
|---|---|---|
| DE | 68922979 | 12/1995 |
| DE | 19855929 A1 | 6/2000 |
| DE | 60105338 | 5/2011 |
| EP | 0755762 | 6/1999 |
| EP | 0916477 B2 | 5/2008 |
| EP | 2071639 A1 | 6/2009 |
| JP | S60132743 A | 7/1985 |
| JP | 2016078308 A | 5/2016 |
| WO | 8909123 A1 | 10/1989 |
| WO | 2009120920 | 1/2010 |
| WO | 2008149615 A9 | 3/2010 |

OTHER PUBLICATIONS

European Search Report; Application EP20154048; dated Jul. 28, 2020.
AIM Thermoplastics Video; youtube.com; Feb. 11, 2019.
Compression molding; Wikipedia; Feb. 4, 2019.
D. DeWayne Howell et al.; Compression Molding of Long Chopped Fiber Thermoplastic Composites; Fairfield, CA.
M.I. Abdul Rasheed; Compression molding of chopped woven thermoplastic composite flakes, A study of processing and performance; 2016.
Thermoplastics; Processes; https://www.aim-aerospace.com/processes; Feb. 11, 2019.
European office action; Application 201510211; dated Sep. 9, 2021.

* cited by examiner

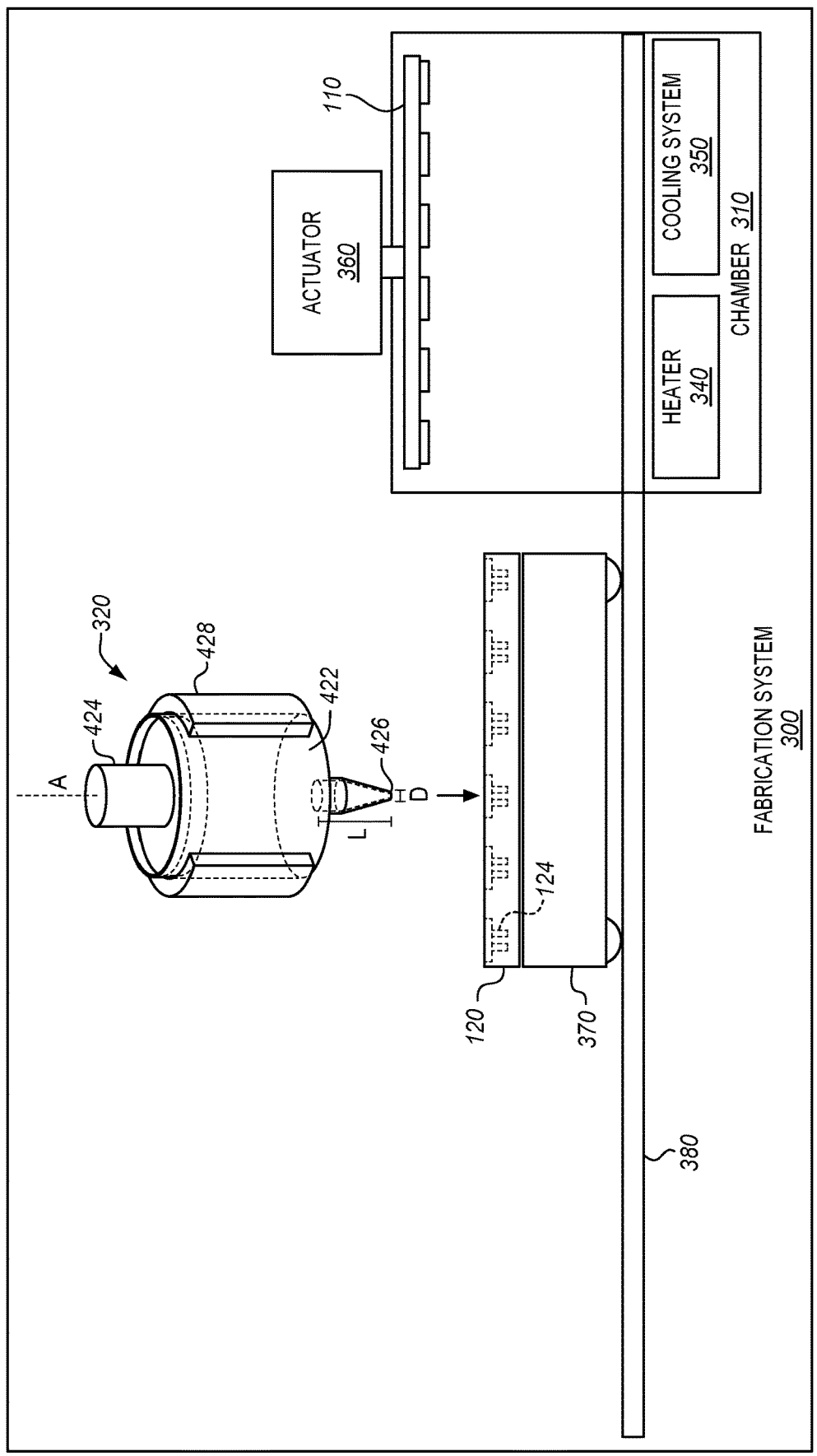

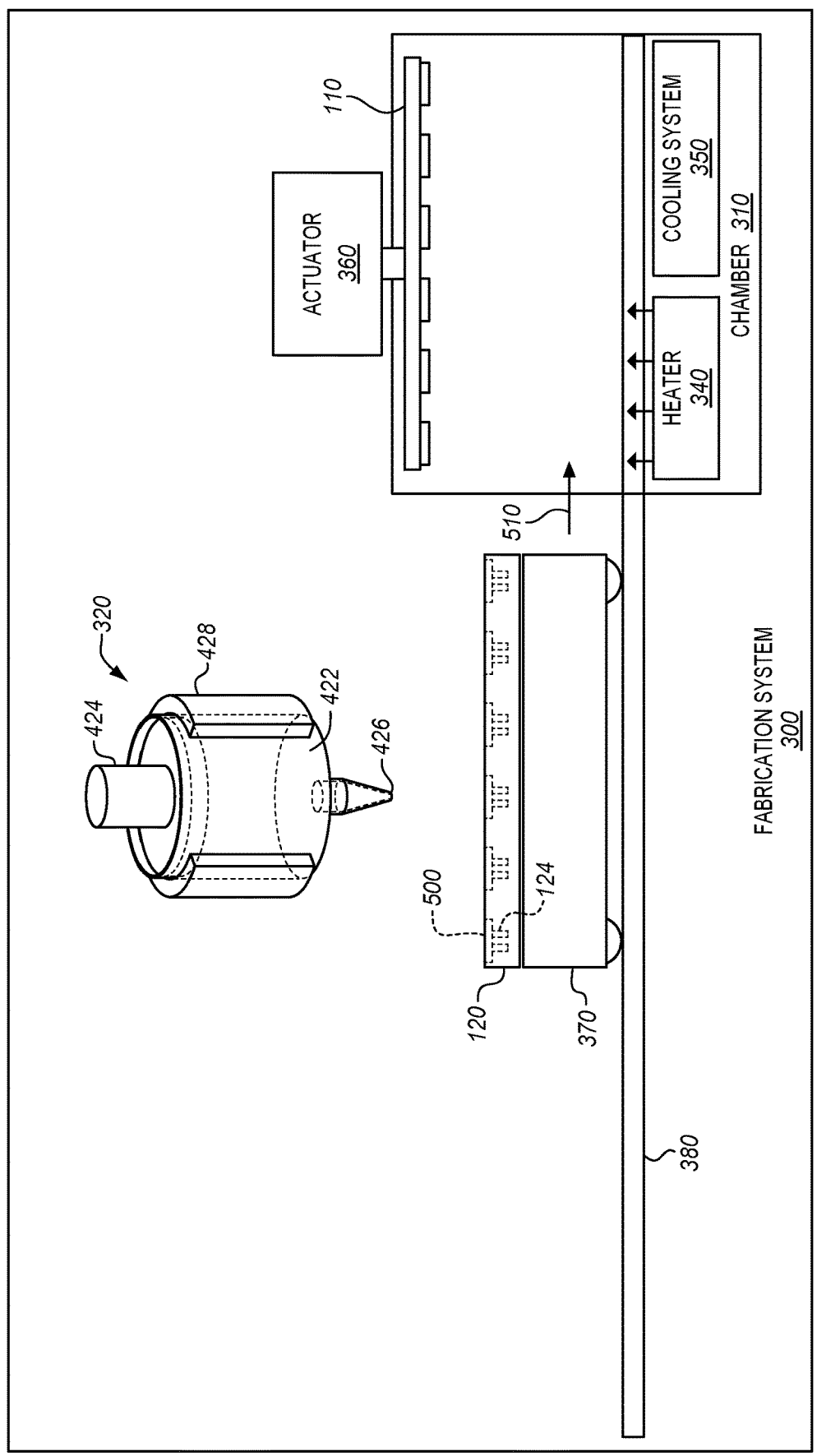

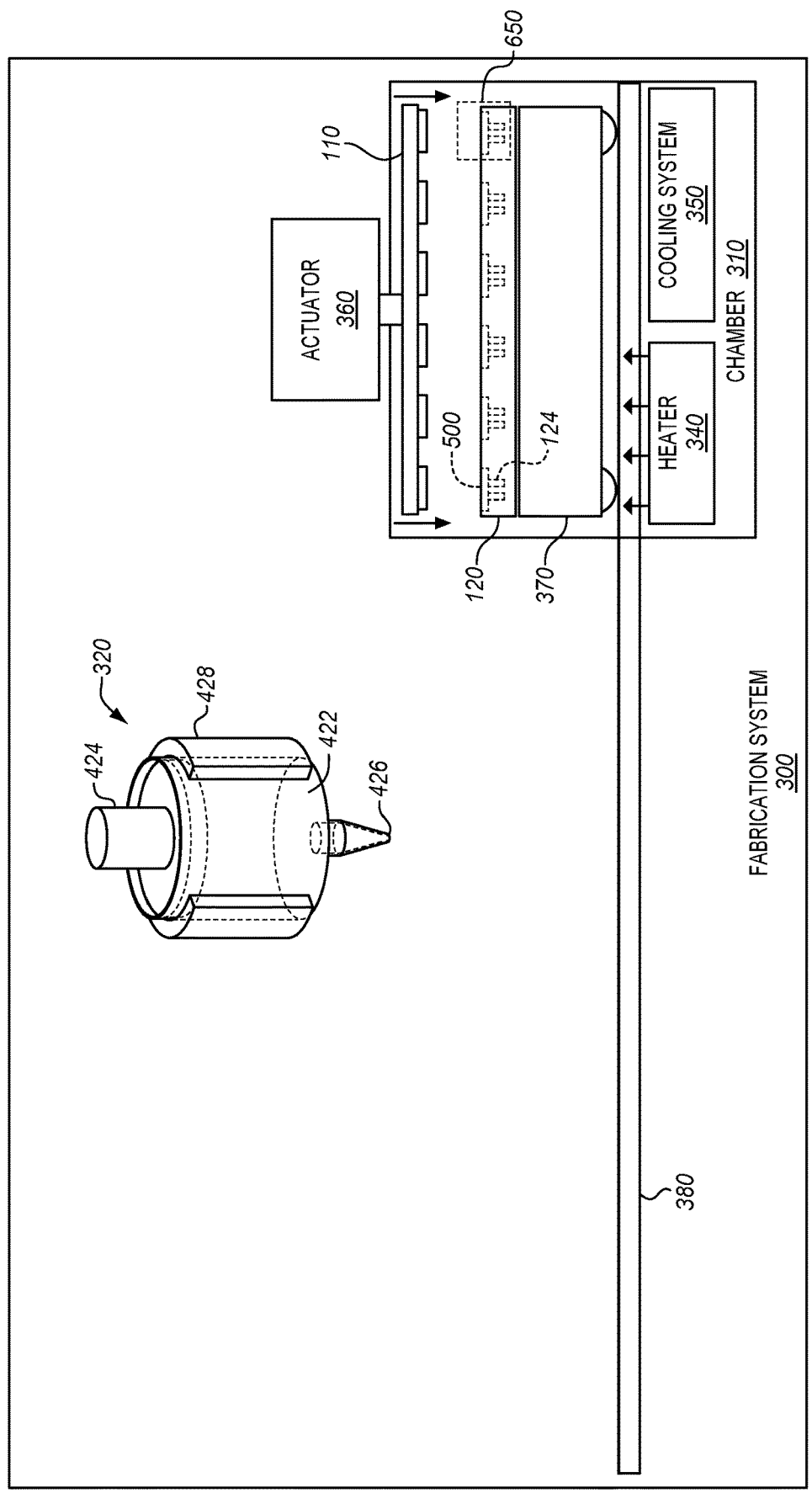

MOLTEN EXTRUSION LOADING FOR COMPRESSION MOLDS USING CHOPPED PREPREG FIBER

FIELD

The disclosure relates to the field of composite materials, and in particular, to fabrication of composite parts.

BACKGROUND

"Chopped prepreg fiber" is a term that refers to pieces of discontinuous fiber reinforced thermoplastic. Each piece is relatively small (e.g., less than ten inches across) and includes segments of fiber (e.g., fiberglass, carbon fiber, etc.). When pieces of chopped prepreg-fiber are heated to a melting temperature and subjected to pressure, thermoplastic between the pieces intermingles, resulting in a single composite part reinforced by randomly oriented short fibers. Hence, as used herein "chopped prepreg fiber" refers to chopped unidirectional flakes of fiber reinforced prepreg.

Pieces of chopped prepreg fiber may be prepared by shredding scrap composite materials which would otherwise be discarded, or pieces may be cut to specific dimensions from uni-directional prepreg tapes. Hence, each cut piece may include unidirectional fibers impregnated with thermoplastic. The resulting pieces of chopped prepreg fiber have a significant amount of bulk. That is, when pieces of chopped prepreg fiber are stacked into a die for molding, the pieces are separated by air gaps. The air gaps increase the amount of volume occupied by the stack of chopped prepreg fiber.

Therefore, it would be desirable to have a method and apparatus that take into account at least some of the issues discussed above, as well as other possible issues.

SUMMARY

Embodiments described herein apply molten chopped prepreg fiber directly to compression molding dies for chopped prepreg fiber parts. By directly applying molten chopped prepreg fiber to the dies, fiber orientation within the resulting composite part may be controlled. Additionally, because molten chopped prepreg fiber is applied directly to receptacles in the dies, the receptacles do not need to be created with a volume large enough to accommodate an unconsolidated stack/charge of chopped prepreg fiber pieces. This reduces the size of the dies used for compression molding, which reduces the thermal mass of the dies. This feature therefore results in a technical benefit of reduced heating requirements and faster cycle times.

One embodiment is a method for fabricating a composite part. The method comprises heating a female die having a receptacle and a complementary male die, heating an extruder above a melting point of a thermoplastic within chopped prepreg fiber, in order to melt chopped prepreg fiber disposed within the extruder, extruding the chopped prepreg fiber from the extruder into the receptacle of the female die while the chopped prepreg fiber remains molten, pressing the male die into the female die, causing the molten chopped prepreg fiber to fully enter receptacle, and cooling the chopped prepreg fiber in the receptacle of the female die to form a composite part.

A further embodiment is a non-transitory computer readable medium embodying programmed instructions which, when executed by a processor, are operable for performing a method for fabricating a composite part. The method comprises heating a female die having a receptacle and a complementary male die, heating an extruder above a melting point of a thermoplastic within chopped prepreg fiber, in order to melt chopped prepreg fiber disposed within the extruder, extruding the chopped prepreg fiber from the extruder into the receptacle of the female die while the chopped prepreg fiber remains molten, pressing the male die into the female die, causing the molten chopped prepreg fiber to fully enter receptacle, and cooling the chopped prepreg fiber in the receptacle of the female die to form a composite part.

A still further embodiment is a system for fabricating a composite part. The system includes a female die comprising: a body defining a receptacle; and integral heating elements. The system also includes a male die comprising: a body defining a protrusion that complements a shape of the receptacle, and integral heating elements. The system further includes an extruder storing melted chopped prepreg fiber comprising discontinuous fibers and thermoplastic for extrusion into the receptacle.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIGS. 3-5, 6A-6B, and 7A-7B illustrate application of molten chopped prepreg fiber during compression molding in an illustrative embodiment.

DESCRIPTION

The figures and the following description provide specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
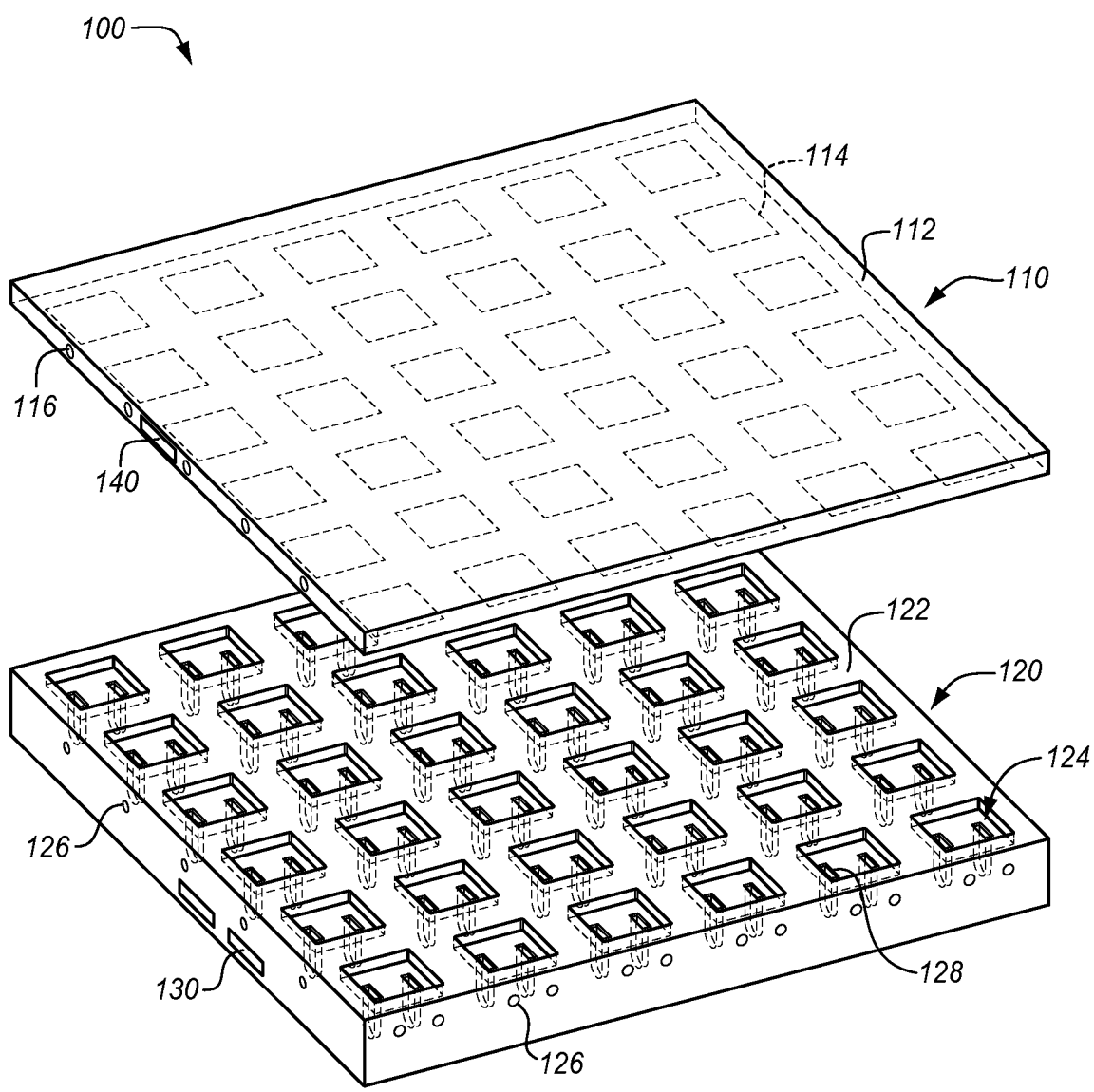
FIG. 1 is a diagram of a compression molding apparatus for chopped prepreg fiber composite parts in an illustrative embodiment.

FIG. 1 is a diagram of a compression molding apparatus 100 for chopped prepreg fiber composite parts in an illustrative embodiment. According to FIG. 1, compression molding apparatus 100 includes male die 110 and female die 120, which are forced together at pressure to compression mold chopped prepreg fiber (comprising thermoplastic and fibers) into desired shapes for composite parts. Compression molding apparatus 100 has been dimensioned to receive molten chopped prepreg fiber instead of loose-stacked chips of chopped prepreg fiber, which means that the size of receptacles within female die 120 has been tuned to accommodate a bulk factor of molten chopped prepreg fiber (having a bulk factor of one) as opposed to a bulk factor of chips of chopped prepreg fiber (having a bulk factor between five and ten). As used herein, "bulk factor" refers to the ratio of the volume of chips of chopped prepreg fiber to the volume of an equal weight of the chips of chopped prepreg fiber after consolidation into a voidless solid.

In this embodiment, female die 120 includes body 122, which defines one or more receptacles 124 for receiving molten chopped prepreg fiber. Each receptacle 124 defines a shape for a composite part, such that when molten chopped prepreg fiber is compression molded within a receptacle 124, it forms the shape. In this embodiment, receptacles 124 include prongs 128. In further embodiments, receptacles 124 may include additional features having complex geometry, such as bends and twists. Because each receptacle 124 is dimensioned to receive molten chopped prepreg fiber (i.e., a molten mass created by melting chips of chopped prepreg fiber) instead of stacked chips of chopped prepreg fiber, a ratio of receptacle volume to resulting composite part volume is reduced. For example, while prior compression molding dies for chopped prepreg fiber composite parts may exhibit a ratio of receptacle volume to the volume of a composite part fabricated in the volume between five to one and ten to one, receptacles 124 may exhibit a ratio of less than two (e.g., one and a half) with respect to their resulting composite parts. This reduces the overall size and weight of female die 120, which reduces the amount of energy needed to heat and cool the female die 120, and increases the speed at which female die 120 reaches a compression molding temperature.

In this embodiment, female die 120 also includes integral heaters 130 (e.g., smart susceptors, ferromagnetic susceptors, resistive heaters, etc.) which heat the female die 120, and cooling pathways 126, through which a cooling fluid (e.g., water, air, oil, etc.) is driven. However, in further embodiments, the female die 120 may be pre-heated in an oven or by an adjacent heating element that applies heat via radiant energy or conductive processes. Female die 120 may further be partitioned or segmented to facilitate extraction of completed composite parts that would otherwise be geometrically locked into receptacles 124, and may include features (e.g., valves) that enable excess air in receptacles 124 to escape during compression molding.

Male die 110 includes body 112, from which protrusions 114 extend. Protrusions 114 are each complementary to a receptacle 124. That is, each protrusion 114 is aligned with a receptacle 124 at female die 120, and is dimensioned to enter a receptacle 124 in a manner that prevents molten chopped prepreg fiber from flowing out of the receptacle 124. During compression molding, the protrusions 114 proceed into receptacles 124 and compress molten chopped prepreg fiber within receptacles 124. This drives the molten chopped prepreg fiber into receptacles 124, forming the molten chopped prepreg fiber into a desired shape for a composite part. That is, protrusions 114 deliver physical compression molding force in order to shape chopped prepreg fiber within receptacles 124, and hence provide the technical benefit of shaping chopped prepreg fiber into composite parts. Specifically, protrusions 114, when used on molten chopped prepreg fiber instead of solid chips of chopped prepreg fiber, cause the molten chopped prepreg fiber to flow more evenly and responsively when undergoing compression. This reduces the amount of pressure needed to form a composite part, because molten chopped prepreg fiber is more viscous and fluidic. Hence, less energy is needed to perform compression molding, and the results of the compression molding are more uniform. Because protrusions 114 directly contact chopped prepreg fiber during the compression molding process, protrusions 114 define at least one side of the resulting composite part. Male die 110 also includes fluid pathways 116 which facilitate cooling, and one or more heaters 140.

Illustrative details of the operation of compression molding apparatus 100 will be discussed with regard to FIG. 2. Assume, for this embodiment, that a technician is in the process of preparing to fabricate a composite part from chopped prepreg fiber. Thermoplastic within the chopped prepreg fiber may comprise polyether ether ketone (PEEK), polyaryletherketone (PAEK), polyphenylene sulfide (PPS), nylon, etc.

Figure 2:
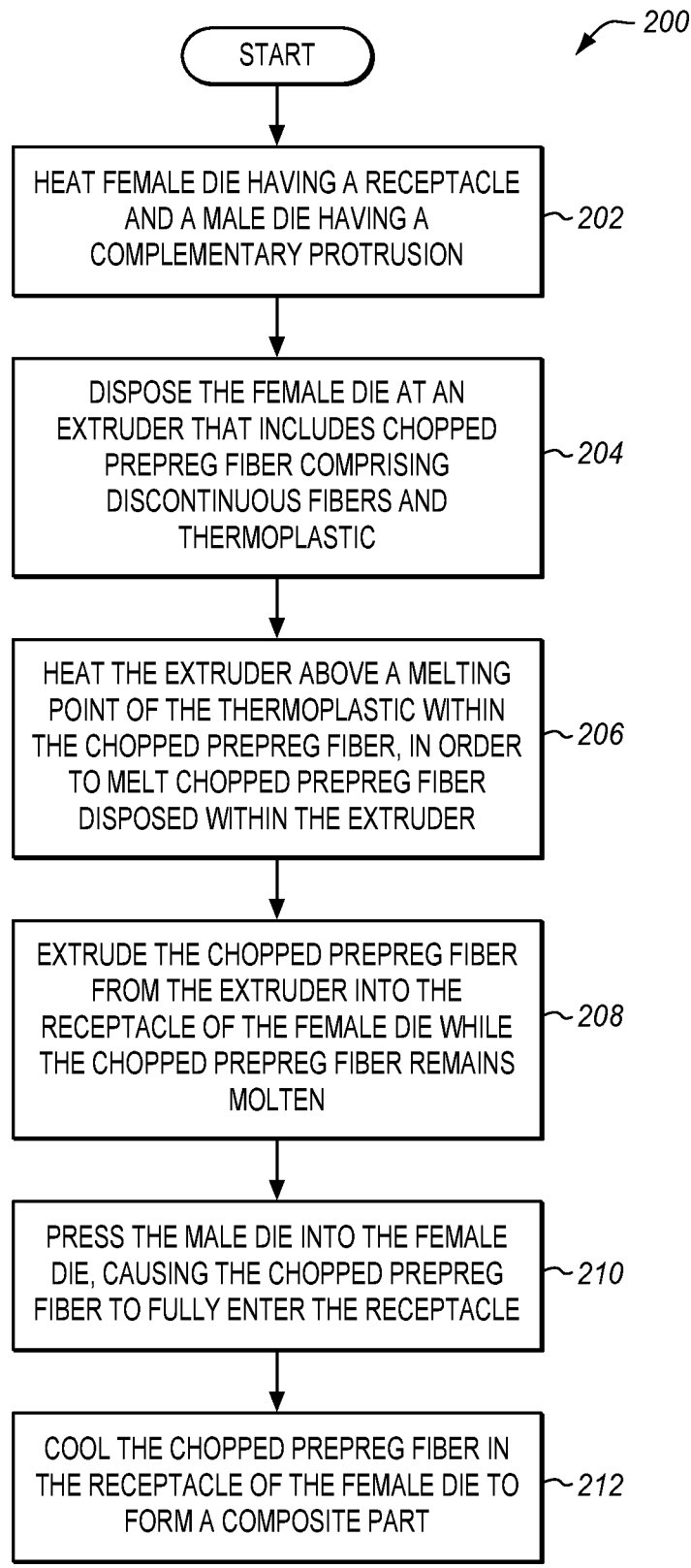
FIG. 2 is a flowchart illustrating a method for operating a compression molding apparatus for chopped prepreg fiber composite parts in an illustrative embodiment.

FIG. 2 is a flowchart illustrating a method for operating a compression molding apparatus for chopped prepreg fiber composite parts in an illustrative embodiment. The steps of method 200 are described with reference to compression molding apparatus 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, female die 120 and male die 110 are heated. This step is part of a preheating process which ensures that molten chopped prepreg fiber entering female die will not seize or otherwise solidify during the compression molding process. That is, the preheating process prevents premature solidification of molten chopped prepreg fiber. At this point in time, the dies need not exceed the melting temperature of the chopped prepreg fiber, and may even be heated to a temperature corresponding with (e.g., within fifty degrees Fahrenheit below or above) the melting temperature of the chopped prepreg fiber, if desired. The heating process ensures that molten chopped prepreg fiber applied to female die 120 will not seize or solidify during the compression molding process. The protrusions and recesses of the dies discussed herein ensure conformance of the molten chopped prepreg fiber with desired outlines of a composite part.

In step 204, female die 120 is disposed at an extruder (e.g., extruder 320 of FIG. 3) that includes chopped prepreg fiber comprising discontinuous fibers and thermoplastic. The extruder is heated above a melting point of the thermoplastic and below a degradation temperature of the thermoplastic within the chopped prepreg fiber (e.g., between six hundred and eight hundred degrees Fahrenheit (F)) in step 206. In step 208, the extruder extrudes a volume of molten chopped prepreg fiber (i.e., a combination of liquid-phase thermoplastic and solid discontinuous fibers) into each of the receptacles 124 of the female die 120 matching the volumes of those receptacles (e.g., within a desired level of volumetric accuracy), while the chopped prepreg fiber remains molten. Female die 120 is now loaded with molten chopped prepreg fiber for use in compression molding. The molten chopped prepreg fiber provided by the extruder may be prepared by heating chips of chopped prepreg fiber (e.g., comprising a plurality of unidirectional fibers) into a molten state, or by mixing discontinuous fibers into a volume of liquid thermoplastic.

Figure 9:
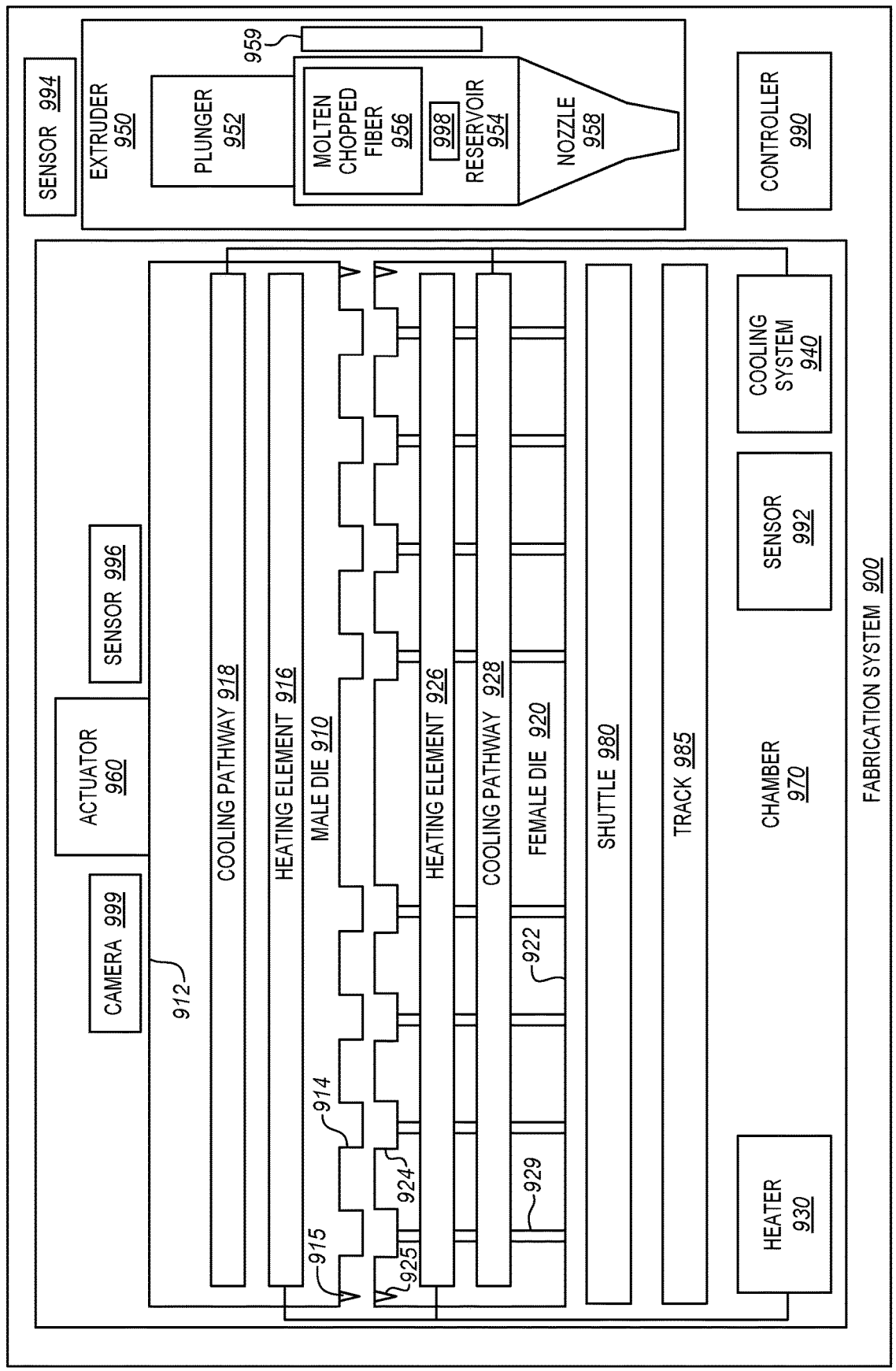
FIG. 9 is a block diagram of a fabrication system in an illustrative embodiment.

In step 210, male die 110 is pressed into the female die 120 at pressure (e.g., between twenty and five thousand pounds per square inch (PSI)). Because the chopped prepreg fiber is molten (i.e., because the thermoplastic portion of the chopped prepreg fiber has melted), applied pressures causes the chopped prepreg fiber to flow into conformance with the shape defined by each receptacle 124. That is, pressing the male die 110 into the female die 120 causes the chopped prepreg fiber to fully enter the receptacle 124. The amount of pressure applied during molding may depend on the geometry and the distance over which the chopped prepreg fiber flows. That is, more complex geometries and larger flow distances may require higher pressure. Because there is no air within the receptacles 124, the compression molding process also does not result in air pockets in resulting composite parts. In step 212, the chopped prepreg fiber is cooled in the receptacles 124 to form composite parts. In further embodiments, the dies described herein may be segmented in order to facilitate extraction of the resulting composite parts or to facilitate cooling, or the dies may include ejection pins (as shown in FIG. 9) for this purpose. For example, female die 120 may comprise a segmented die that is separated after cooling in order to extract composite parts. Unlike injection molding, which is a single-step process, the compression molding techniques described herein are two-step processes wherein filling and pressing are performed separately. Utilizing compression molding instead of injection molding provides a technical benefit in the form of enabling larger reinforcement, reduced pressure requirements (e.g., several tens or hundreds of PSI instead of thousands of PSI), reduced tooling complexity, and enhanced conformance to desired shapes.

Figure 3:
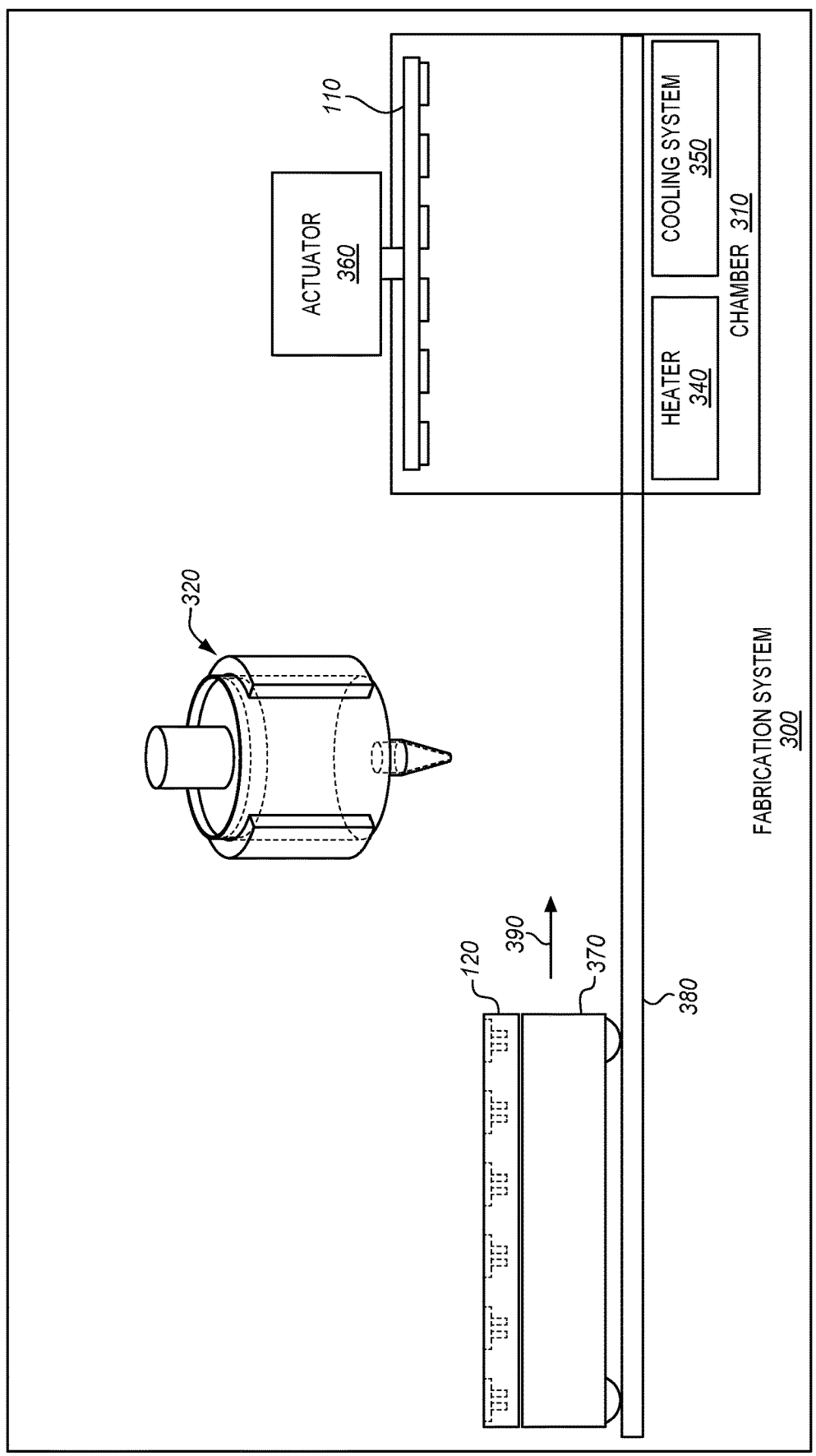

FIGS. 3-7 illustrate application of molten chopped prepreg fiber during compression molding in accordance with method 200 of FIG. 2 in an illustrative embodiment. As shown in FIG. 3, a fabrication system 300 has been assembled, wherein male die 110 is placed into a chamber 310, and is driven by an actuator 360 (e.g., a press) at chamber 310. Chamber 310 includes a heater 340. In one embodiment, heater 340 is an electromagnetic field generator that generates an electric field. The electric field causes susceptors in male die 110 and/or female die 120 to generate heat. In further embodiments, heater 340 comprises an infrared heater, a resistive heater, etc. Chamber 310 also includes a cooling system 350, such as a pressurized source of cooling fluid, having a reservoir (not shown) disposed outside of chamber 310. Female die 120 has been loaded onto a shuttle 370 which may proceed along track 300 in direction 390. An extruder 320 is also disposed along track 380.

In FIG. 4, female die 120 has been moved under extruder 320. Extruder 320 includes a reservoir 422 of molten chopped prepreg fiber, which is kept at or above a melting temperature of the thermoplastic within the chopped prepreg fiber by heater 428. Operation of a plunger 424 drives molten chopped prepreg fiber from reservoir 422 out of nozzle 426, which has a diameter D and a length L. These dimensions of nozzle 426, and other features such as slope, may be adjusted in order to control an alignment of fibers as disposed within each receptacle. A narrow nozzle diameter may cause disposed fibers to align with axis A, while a wider nozzle may cause disposed fibers to be more randomly distributed. If the nozzle length is longer, more alignment of fibers with axis A may also occur, depending on the viscosity of the thermoplastic when molten, and also depending on the extrusion speed. In some embodiments, nozzle 426 is interchangeable, such that different nozzles may be placed onto extruder 320 depending on the composite part being fabricated. This enables fiber orientation/alignment to be controlled, which may adjust physical properties (e.g., strength) of the resulting composite part with respect to forces applied in different directions. Thus, in some embodiments the fibers are oriented randomly or evenly across all directions, in order to provide substantially isotropic characteristics in the resulting composite part.

Molten chopped prepreg fiber leaving the nozzle 426 is deposited in receptacles 124, resulting in pools 500 of molten chopped prepreg fiber as shown in FIG. 5. During this process, extruder 320 and/or female die 120 may be moved to align nozzle 426 with additional receptacles for filling. FIG. 5 also illustrates that heater 340 is activated, and that female die 120 will proceed in direction 510 into chamber 310 after it is loaded.

In further embodiments, both female die 120 and male die 110 may remain within chamber 310, and extruder 320 may enter chamber 310 in order to apply molten chopped prepreg fiber. These configurations may be beneficial in environments where extruder 320 is attached to a robot arm or similar device that is capable of three-axis movement. These configurations also need not utilize a shuttle or other conveyor for female die 120. Thus, in some embodiments both female die 120 and male die 110 may remain static in chamber 310, and the extruder 320 may move among the dies to fill receptacles as desired.

Figure 6B:
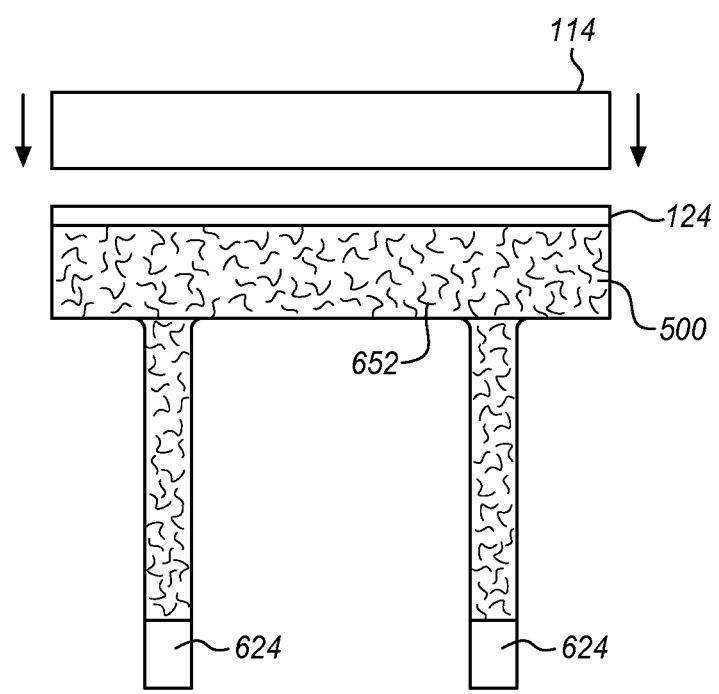
Figure 7A:
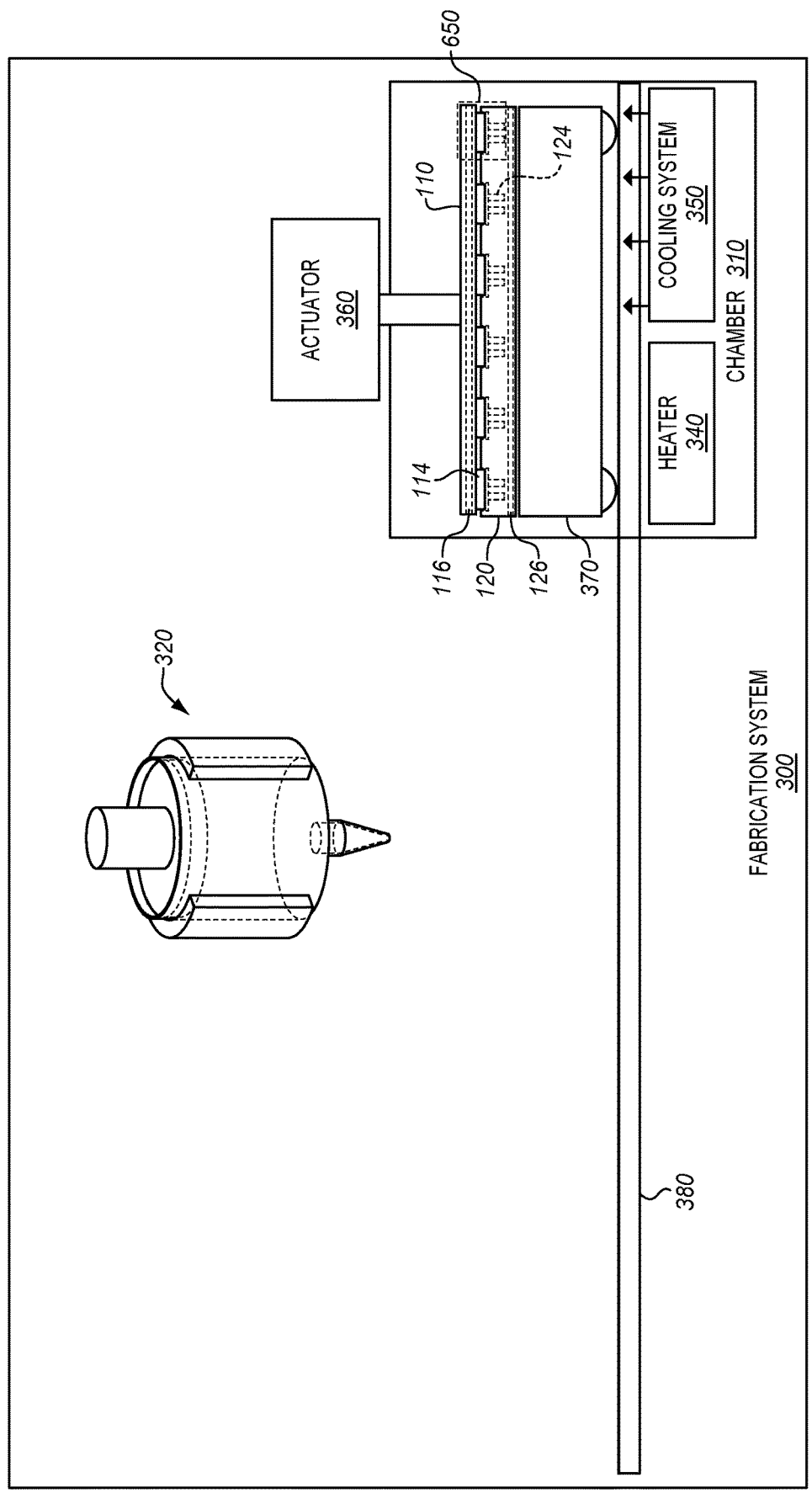
Figure 7B:
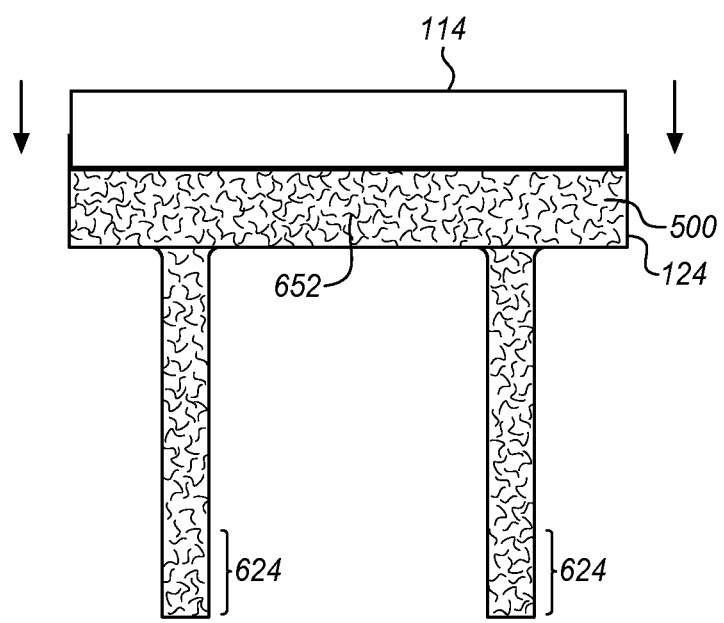

Male die 110 may be heated within chamber 310 as shown in FIG. 3, and female die 120 may be heated via its integral heaters 130. Air may also be evacuated from chamber 310. In FIG. 6A, actuator 360 drives male die 110 into female die 120 while pools 500 of chopped prepreg fiber remain molten. FIG. 6B, which corresponds with region 650 of FIG. 6A, illustrates a protrusion 114 proceeding towards a pool 500, and illustrates fibers 652 within the pool. The pool 500 has partially, but not fully, entered its receptacle 124, because regions 624 remain unfilled. The fibers 652 are substantially randomly oriented. Because protrusions 114 on male die 110 are complementary to receptacles 124 on female die 120, the driving action forces molten chopped prepreg fiber in each receptacle 124 into a desired shape, instead of squeezing molten chopped prepreg fiber out of each receptacle 124. In FIG. 7A, after compression molding has completed by the driving of protrusions 114 into receptacles 124, cooling system 350 is activated. Cooling system 350 drives cooling fluid through cooling pathways 126 and 116 to cool the dies below the melting temperature of thermoplastic in the chopped prepreg fiber. This solidifies the chopped prepreg fiber residing in receptacles 124 into composite parts. FIG. 7B, which corresponds with region 750 of FIG. 7A, illustrates a protrusion 114 actively compression molding a pool 500. The pool 500 has now fully entered its receptacle 124, and regions 624 are now filled. The fibers 652 have been moved, but remain substantially randomly oriented.

Figure 8:
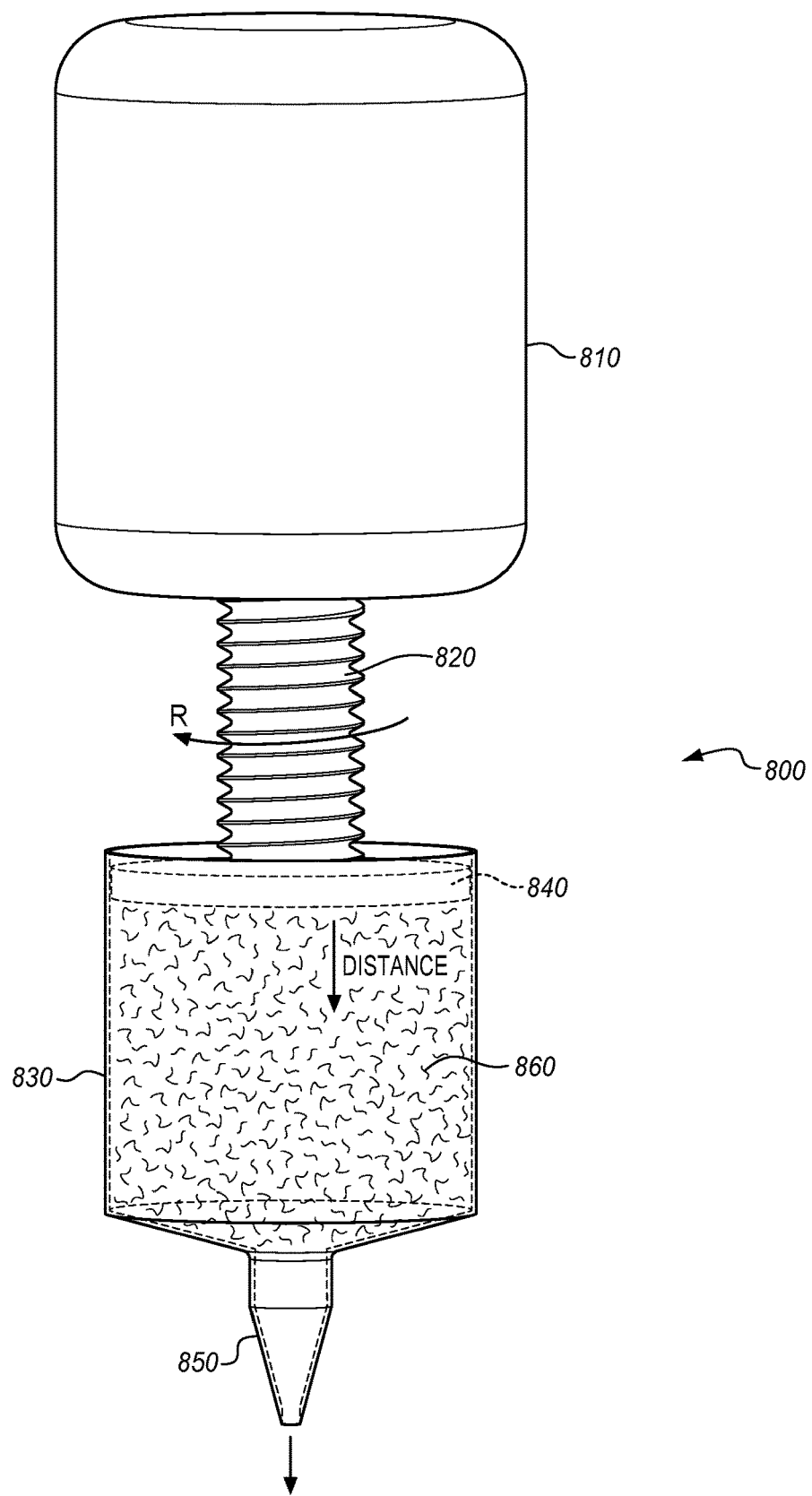
FIG. 8 is a diagram of an extruder that utilizes a screw shaft to controllably apply predetermined volumes of molten chopped prepreg fiber to a die in an illustrative embodiment.

FIG. 8 is a diagram of an extruder 800 that utilizes a screw shaft 820 to controllably apply predetermined volumes of molten chopped prepreg fiber from a reservoir 830 to a die in an illustrative embodiment. In this embodiment, a rotational motor 810 drives plate 840 in direction R with respect to screw shaft 820. Because screw shaft 820 is threaded, a known angular rotation of rotational motor 810 causes plate 840 to proceed a known distance downward. This causes a known amount of molten chopped prepreg fiber 860 to be ejected via nozzle 850. Hence, techniques for repeatably controlling the operations of rotational motor 810 beneficially enable the volume (or weight) of chopped prepreg fiber dispensed at each receptacle of a female die to be controlled.

Examples

In the following examples, additional processes, systems, and methods are described in the context of a compression molding system for chopped prepreg fiber composite parts.

FIG. 9 is a block diagram of a fabrication system 900 in an illustrative embodiment. According to FIG. 9, fabrication system 900 includes chamber 970, in which male die 910 and female die 920 are disposed. Female die 920 includes body 922, receptacles 924. Female die 920 also includes heating element 926, and cooling pathway 928 coupled with heater 930 and cooling system 940, respectively. Ejection pins 929 are also included, which may be driven in order to force solid composite parts out of female die 920. Female die 920 is maintained at shuttle 980, which traverses along track 985.

Male die 910 includes body 912, protrusions 914, heating element 916, and cooling pathway 918. Male die 910 also includes alignment pins 915, which align with recesses 925 at female die 920. Male die 910 is driven by actuator 960 into female die 920 in order to perform compression molding. Compression molding, particularly in the manner described above, may provide for greater control of fiber orientation than injection molding, and may further be performed at lower pressures (e.g., hundreds of PSI instead of thousands of PSI).

Heater 930 may comprise a resistive heating element or infrared source. In embodiments where heating elements 916 and 926 are susceptors, heater 930 may generate electromagnetic fields that heat these components. Cooling system 940 may be coupled via hoses or other linkages to female die 920 after female die reaches chamber 970. Cooling system 940 drives cooling fluid through cooling pathway 918 and cooling pathway 928 after compression has completed, in order to increase the speed of fabrication of composite parts.

Extruder 950 resides outside of chamber 970, and includes a plunger 952 which drives molten chopped prepreg fiber 956 out of reservoir 954 through nozzle 958 into receptacles 924. Extruder 950 also includes a heater 959 which maintains molten chopped prepreg fiber 956 within reservoir 954 in a molten state. Extruder 950 may perform extrusion while female die 920 and shuttle 980 are disposed beneath it (e.g., prior to female die 920 entering chamber 970).

Fabrication system 900 also includes controller 990, which controls the operations of various components described herein. For example, controller 990 interacts with sensor 992 (e.g., a temperature sensor) in order to control heater 930 and/or cooling system 940. Controller 990 further interacts with sensor 994 (e.g., a rotational sensor) in order to control dispensing of molten chopped prepreg fiber, and interacts with sensor 996 (e.g., a pressure sensor) to control operations of actuator 960. Controller 990 may additionally utilize input from a temperature sensor 998 in order to control heater 959. Controller 990 may be implemented, for example, as custom circuitry, as a hardware processor executing programmed instructions, or some combination thereof. Controller 990 may further control alignment of extruder 950 with each of receptacle 924. For example, controller 990 may direct repositioning of nozzle 958 of extruder 950 according to an NC program, or may operate a visual sensing system such as camera 999 to direct alignment of nozzle 958 with receptacles 924.

Figure 10:
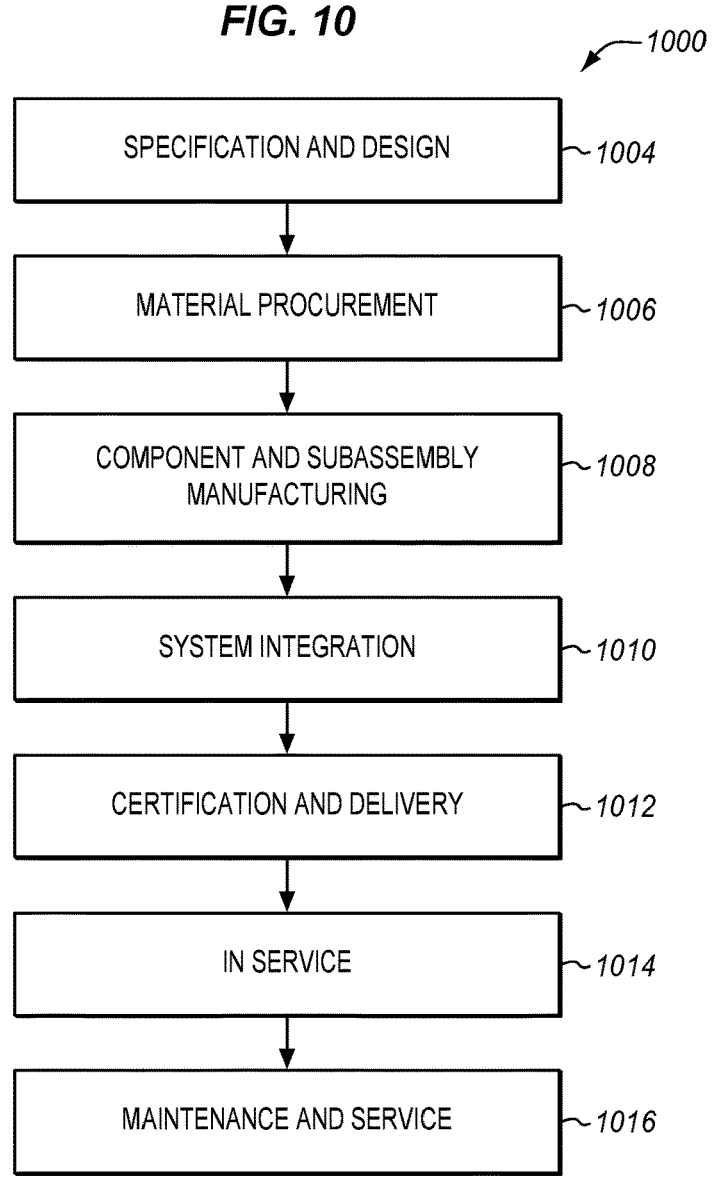
FIG. 10 is a flow diagram of aircraft production and service methodology in an illustrative embodiment.
Figure 11:
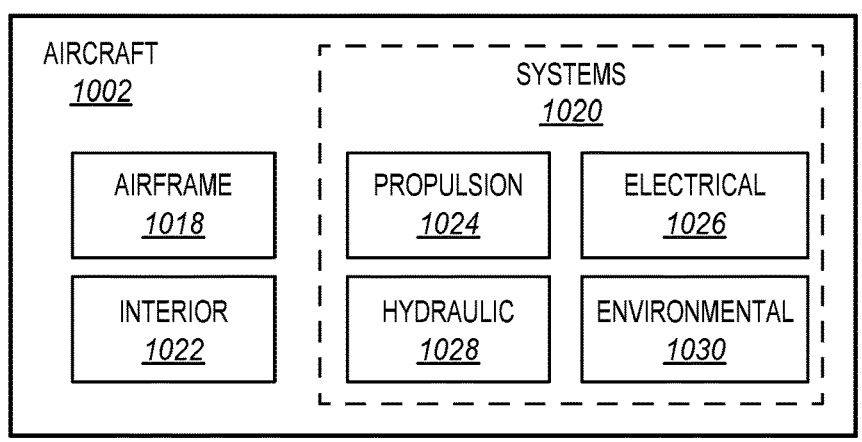
FIG. 11 is a block diagram of an aircraft in an illustrative embodiment.

Referring more particularly to the drawings, embodiments of the disclosure may be described in the context of aircraft manufacturing and service in method 1000 as shown in FIG. 10 and an aircraft 1002 as shown in FIG. 11. During pre-production, method 1000 may include specification and design 1004 of the aircraft 1002 and material procurement 1006. During production, component and subassembly manufacturing 1008 and system integration 1010 of the aircraft 1002 takes place. Thereafter, the aircraft 1002 may go through certification and delivery 1012 in order to be placed in service 1014. While in service by a customer, the aircraft 1002 is scheduled for routine work in maintenance and service 1016 (which may also include modification, reconfiguration, refurbishment, and so on). Apparatus and methods embodied herein may be employed during any one or more suitable stages of the production and service described in method 1000 (e.g., specification and design 1004, material procurement 1006, component and subassembly manufacturing 1008, system integration 1010, certification and delivery 1012, service 1014, maintenance and service 1016) and/or any suitable component of aircraft 1002 (e.g., airframe 1018, systems 1020, interior 1022, propulsion system 1024, electrical system 1026, hydraulic system 1028, environmental 1030).

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 1002 produced by method 1000 may include an airframe 1018 with a plurality of systems 1020 and an interior 1022. Examples of systems 1020 include one or more of a propulsion system 1024, an electrical system 1026, a hydraulic system 1028, and an environmental system 1030. Any number of other systems may be included. Although an aerospace example is shown, the principles of the invention may be applied to other industries, such as the automotive industry.

As already mentioned above, apparatus and methods embodied herein may be employed during any one or more of the stages of the production and service described in method 1000. For example, components or subassemblies corresponding to component and subassembly manufacturing 1008 may be fabricated or manufactured in a manner similar to components or subassemblies produced while the aircraft 1002 is in service. Also, one or more apparatus embodiments, method embodiments, or a combination thereof may be utilized during the subassembly manufacturing 1008 and system integration 1010, for example, by substantially expediting assembly of or reducing the cost of an aircraft 1002. Similarly, one or more of apparatus embodiments, method embodiments, or a combination thereof may be utilized while the aircraft 1002 is in service, for example and without limitation during the maintenance and service 1016. For example, the techniques and systems described herein may be used for material procurement 1006, component and subassembly manufacturing 1008, system integration 1010, service 1014, and/or maintenance and service 1016, and/or may be used for airframe 1018 and/or interior 1022. These techniques and systems may even be utilized for systems 1020, including, for example, propulsion system 1024, electrical system 1026, hydraulic 1028, and/or environmental system 1030.

In one embodiment, a part comprises a portion of airframe 1018, and is manufactured during component and subassembly manufacturing 1008. The part may then be assembled into an aircraft in system integration 1010, and then be utilized in service 1014 until wear renders the part unusable. Then, in maintenance and service 1016, the part may be discarded and replaced with a newly manufactured part. Inventive components and methods may be utilized throughout component and subassembly manufacturing 1008 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for fabricating a composite part, the method comprising:
    heating a female die having a receptacle and a complementary male die;
    heating an extruder above a melting point of a thermoplastic within chopped prepreg fiber, in order to melt the thermoplastic within the chopped prepreg fiber disposed within the extruder;
    positioning the extruder over the receptacle via operation of a robot arm;
    extruding the chopped prepreg fiber from the extruder into the receptacle of the female die while the thermoplastic within the chopped prepreg fiber remains molten;
    pressing the male die into the female die, causing the chopped prepreg fiber to fully enter the receptacle while the thermoplastic remains molten; and
    cooling the chopped prepreg fiber in the receptacle of the female die to form a composite part.

2. The method of claim 1 wherein:
a volume of the receptacle is less than one and a half times a volume of the chopped prepreg fiber extruded into the receptacle.

3. The method of claim 1 wherein:
the female die includes multiple receptacles, and the method further comprises:
extruding the chopped prepreg fiber from the extruder into the multiple receptacles of the female die.

4. The method of claim 1 wherein:
the female die comprises a segmented die, and the method further comprises:
separating segments of the segmented die to remove a composite part from the receptacle.

5. The method of claim 1 wherein:
heating the female die and the male die comprises applying an electromagnetic field that causes susceptors within the female die and the male die to increase in temperature.

6. The method of claim 1 wherein:
heating the female die and the male die comprises applying current to resistive heating elements within the female die and the male die.

7. The method of claim 1 wherein:
cooling the chopped prepreg fiber comprises applying a cooling fluid to the female die and the male die.

8. The method of claim 1 wherein:
the male die has a protrusion that is complementary to the receptacle.

9. The method of claim 1 further comprising:
disposing the female die at the extruder.

10. The method of claim 1 wherein:
the composite part formed in claim 1 is an aircraft part.

11. The method of claim 1 wherein:
extruding the chopped prepreg fiber comprises extruding fiberglass.

12. The method of claim 1 wherein:
extruding the chopped prepreg fiber comprises extruding carbon fiber.

13. The method of claim 1 wherein:
heating the extruder in order to melt the thermoplastic results in melting at least one of polyether ether ketone (PEEK), polyaryletherketone (PAEK), polyphenylene sulfide (PPS), or nylon.

14. The method of claim 1 wherein:
pressing the male die into the female die is performed at a pressure between twenty and five thousand pounds per square inch.

15. The method of claim 1 wherein:
heating the extruder increases a temperature of the extruder to between six hundred and eight hundred degrees Fahrenheit.

16. The method of claim 1 further comprising:
selecting a nozzle of the extruder to control fiber orientation of dispensed chopped prepreg fiber.

17. The method of claim 16 wherein:
selecting the nozzle comprises selecting a nozzle having a diameter that aligns fiber with an axis of the nozzle.

18. The method of claim 16 wherein:
selecting the nozzle comprises selecting a nozzle having a diameter that causes fiber to be aligned randomly.

19. The method of claim 1 wherein:
extruding the chopped prepreg fiber comprises operating a screw shaft of the extruder.

20. The method of claim 1 wherein:
heating the female die and the male die comprises operating an infrared heater.

21. A non-transitory computer readable medium embodying programmed instructions which, when executed by a processor, are operable for performing a method for fabricating a composite part, the method comprising:
heating a female die having a receptacle and a complementary male die;
heating an extruder above a melting point of a thermoplastic within chopped prepreg fiber, in order to melt the thermoplastic within the chopped prepreg fiber disposed within the extruder;
positioning the extruder over the receptacle via operation of a robot arm;
extruding the chopped prepreg fiber from the extruder into the receptacle of the female die while the thermoplastic within the chopped prepreg fiber remains molten;
pressing the male die into the female die, causing the chopped prepreg fiber to fully enter the receptacle while the thermoplastic remains molten; and
cooling the chopped prepreg fiber in the receptacle of the female die to form a composite part.

22. The medium of claim 21 wherein:
a volume of the receptacle is less than one and a half times a volume of the chopped prepreg fiber extruded into the receptacle.

23. The medium of claim 21 wherein:
the female die includes multiple receptacles, and the method further comprises:
extruding the chopped prepreg fiber from the extruder into the multiple receptacles of the female die.

24. The medium of claim 21 wherein:
the female die comprises a segmented die, and the method further comprises:
separating segments of the segmented die to remove a composite part from the receptacle.

25. The medium of claim 21 wherein:
heating the female die and the male die comprises applying an electromagnetic field that causes susceptors within the female die and the male die to increase in temperature.

26. The medium of claim 21 wherein:
heating the female die and the male die comprises applying current to resistive heating elements within the female die and the male die.

27. The medium of claim 21 wherein:
cooling the chopped prepreg fiber comprises applying a cooling fluid to the female die and the male die.

28. The medium of claim 21 wherein:
the male die has a protrusion that is complementary to the receptacle.

29. The medium of claim 21 wherein the method further comprises:
disposing the female die at the extruder.

30. A portion of an aircraft assembled according to the method defined by the instructions stored on the computer readable medium of claim 21.

31. A system for fabricating a composite part, the system comprising:
a female die comprising:
a body defining a receptacle;
integral heating elements;
a male die comprising:
a body defining a protrusion that complements a shape of the receptacle;
integral heating elements;
an extruder storing melted chopped prepreg fiber comprising discontinuous fibers and thermoplastic for extrusion into the receptacle; and
a robot arm configured to position the extruder over the receptacle.

32. The system of claim 31 wherein:
the body of the female die defines multiple receptacles; and
the body of the male die defines multiple protrusions that each complement a shape of a corresponding one of the multiple receptacles.

33. The system of claim 31 wherein:
the extruder includes a nozzle having an exit diameter that is smaller than a length of the chopped prepreg fibers.

34. Fabricating a portion of an aircraft using the system of claim 31.

* * * * *